(12) United States Patent
Andrews et al.

(10) Patent No.: US 8,426,330 B2
(45) Date of Patent: Apr. 23, 2013

(54) BORON SUBOXIDE COMPOSITE MATERIAL

(76) Inventors: Anthony Andrews, Kensington (ZA);
Iakovos Sigalas, Johannesburg (ZA);
Mathias Herrmann, Coswig (DE)

( * ) Notice: Subject to any disclaimer, the term of this patent is extended or adjusted under 35 U.S.C. 154(b) by 342 days.

(21) Appl. No.: 12/595,993

(22) PCT Filed: Apr. 24, 2008

(86) PCT No.: PCT/IB2008/051584
§ 371 (c)(1),
(2), (4) Date: Aug. 13, 2010

(87) PCT Pub. No.: WO2008/132672
PCT Pub. Date: Nov. 6, 2008

(65) Prior Publication Data
US 2010/0308256 A1    Dec. 9, 2010

(30) Foreign Application Priority Data

Apr. 26, 2007 (ZA) .................. 2007/03437
Jun. 18, 2007 (GB) .................. 0711773.2
Feb. 18, 2008 (GB) .................. 0802949.8

(51) Int. Cl.
*C04B 35/00* (2006.01)
*C04B 35/50* (2006.01)
*B32B 9/00* (2006.01)
*B32B 19/00* (2006.01)
*B32B 9/04* (2006.01)

(52) U.S. Cl.
USPC ............ 501/126; 501/152; 428/702; 428/704

(58) Field of Classification Search .................. 501/126, 501/152; 51/309; 428/688, 689, 699, 702, 428/704
See application file for complete search history.

(56) References Cited

U.S. PATENT DOCUMENTS 3,660,131 A   5/1972   Murray et al.
5,330,937 A   7/1994   Ellison-Hayashi et al.
(Continued)

FOREIGN PATENT DOCUMENTS

EP   0 621 327 A   10/1994
FR   2 241 495     3/1975
(Continued)

OTHER PUBLICATIONS

Cao, Minghe et al.: "A simple method to prepare boron suboxide fibres", *J. Electroceram.*, (2006), 17, pp. 817-820.
(Continued)

*Primary Examiner* — Kaj K Olsen
*Assistant Examiner* — Noah Wiese
(74) *Attorney, Agent, or Firm* — Frommer Lawrence & Haug LLP; Ronald R Santucci

(57) ABSTRACT

The invention provides a boron suboxide composite material comprising boron suboxide and a secondary phase, wherein the secondary phase contains a rare earth metal oxide. The rare earth metal oxide may be selected from the oxides of scandium, yttrium, which is preferred, and elements of the lanthanide series, and may be a mixture of rare earth metal oxides. The secondary phase may also include, in addition to the rare earth metal oxide(s), a further oxide or mixture of oxides of an element of the Groups IA, MA, MIA, and IVA of the periodic table. Moreover, the secondary phase may also contain a boride, and particularly a boride selected from the borides of transition metals of the fourth to eighth groups of the periodic table.

20 Claims, 1 Drawing Sheet

U.S. PATENT DOCUMENTS

| | | | |
|---|---|---|---|
| 5,366,526 A * | 11/1994 | Ellison-Hayashi et al. | .... 51/307 |
| 5,456,735 A | 10/1995 | Ellison-Hayashi et al. | |
| 2005/0022457 A1 | 2/2005 | Chen et al. | |
| 2008/0317654 A1 * | 12/2008 | Davies et al. | ................. 423/279 |

FOREIGN PATENT DOCUMENTS

| | | |
|---|---|---|
| JP | 07-034063 | 2/1995 |
| JP | 09-071468 A | 3/1997 |
| WO | WO 2007/029102 A | 3/2007 |

OTHER PUBLICATIONS

Andrews, A. et al.: "Liquid phase assisted hot pressing of boron suboxide-materials", *Journal of the European Ceramic Society*, 28 (2008), pp. 1613-1621.

Anstis, G.R. et al.: "A Critical Evaluation of Indentation Techniques for Measuring Fracture Toughness: I, Direct Crack Measurements", *Journal of the American Ceramic Society*, vol. 64, No. 9, Sep. 1981, pp. 533-538.

He, Duanwei et al.: "Boron suboxide: As hard as cubic boron nitride", *Applied Physics Letters*, vol. 81, No. 4, Jul. 22, 2002, pp. 643-645.

Hubert, Herve et al.: "High-Pressure, High-Temperature Synthesis and Characterization of Boron Suboxide ($B_6O$)", *Chem. Mater.* 1998, 10, pp. 1530-1537.

Itoh, Hideaki et al.: "High Pressure Sintering of $B_6O$ Powder and Properties of Sintered Compact", *J. Soc. Mat. Sci., Japan*, vol. 47, No. 10, Oct. 1998, pp. 1000-1005. In Japanese, English Abstract.

Itoh, Hideaki et al.: "High Pressure Sintering of $B_6O$ Powder and Properties of Sintered Compact", *J. Soc. Mat. Sci., Japan*, vol. 47, No. 10, Oct. 1998, pp. 1000-1005. Full English Translation.

Itoh, Hideaki et al.: "High Pressure Sintering Behavior of $B_6O$-Based Composites", *Rev. High Pressure Sci. Technol.*, vol. 7 (1998), pp. 986-988.

Itoh, H. et al.: "Microstructure and mechanical properties of $B_6O$-$B_4C$ sintered composites prepared under high pressure", *Journal of Materials Science*, 35 (2000), pp. 693-698.

Kleebe, H.J. et al.: "$B_6O$: A Correlation Between Mechanical Properties and Microstructure Evolution upon $Al_2O_3$ Addition During Hot Pressing", *J. Am. Ceram. Soc.*, 91 [2], 2008, pp. 569-575.

Petrak, D.R. et al.: "Mechanical Properties of Hot-Pressed Boron Suboxide and Boron", *Ceramic Bulletin*, vol. 53, No. 8, 1974, pp. 569-573.

Rutz, Heidi L. et al.: "Properties of Yttria-Aluminoborate Glasses", *J. Am. Ceram. Soc.* 73, 6, 1990, pp. 1788-1790.

Sasai, R. et al.: "High pressure consolidation of $B_6O$-diamond mixtures", *Journal of Materials Science*, 36, 2001, pp. 5339-53430.

Shabalala, T.C. et al.: "Hard and Tough Boron Suboxide based Composites", *Advances in Science and Technology*, vol. 45, 2006, pp. 1745-1750.

Itoh, Hideaki et al.: "$B_6O$-$_c$-BN Composites Prepared by High-Pressure Sintering", *J. Am. Ceram. Soc.*, 83 (3) (2000) pp. 501-506.

Cao, Minghe et al.: "A simple method to prepare boron suboxide fibres", *J. Electroceram*, 2006,17, pp. 817-820.

International Search Report issued by European Patent Office, dated Mar. 6, 2009, for related international application PCT/IB2008/051592 (published WO 2008/132676 A3).

International Search Report issued by European Patent Office, dated Feb. 19, 2009, for related international application PCT/IB2008/051587 (published WO 2008/132674 A3).

Karapetyants, M.H. et al.: "General and Inorganic Chemistry", Moscow, Khimia Publishing, 1994 in Russian.

English translation of Russian office action dated Mar. 26, 2012 for corresponding Russian application 2009143565 includes reference to "General and Inorganic Chemistry" by M.H. Karapetyants et al.

* cited by examiner under publication number WO 2008/132672 A2 and claims priority benefits of South African Patent Application No. 2007/03437 filed Apr. 26, 2007, and British Patent Application No. 0711773.2 filed Jun. 18, 2007 and British Patent Application No. 0802949.8 filed Feb. 18, 2008, the disclosures of which are incorporated herein by reference.

BACKGROUND OF THE INVENTION

The invention relates to a boron suboxide composite material.

The development of synthetic ultrahard materials which have hardness values approaching or even exceeding that of diamond has been of great interest to material scientists. With a Vickers hardness of between 70 to 100 GPa, diamond is the hardest material known, followed by cubic boron nitride ($H_V$~60 GPa) and boron suboxide, herein referred to as $B_6O$. Hardness values of 53 GPa and 45 GPa have been determined at 0.49 N and 0.98 N load respectively for $B_6O$ single crystals, which are similar to those of cubic boron nitride [9].

It is known that $B_6O$ may also be non-stoichiometric i.e. exist as $B_6O_{1-x}$ (where x is in the range 0 to 0.3). Such non-stoichiometric forms are included in the term $B_6O$. The strong covalent bonds and short interatomic bond length of these materials contribute to the exceptional physical and chemical properties such as great hardness, low mass density, high thermal conductivity, high chemical inertness and excellent wear resistance [1, 2]. In U.S. Pat. No. 5,330,937 to Ellison-Hayashi et al the formation of boron suboxide powders of nominal composition $B_3O$, $B_4O$, $B_6O$, $B_7O$, $B_8O$, $B_{12}O$, $B_{15}O$ and $B_{18}O$ was reported. Potential industrial applications have been discussed by Kurisuchiyan et al (Japan Patent No. 7,034,063) and Ellison-Hayashi et al (U.S. Pat. No. 5,456,735) and include use in grinding wheels, abrasives and cutting tools.

Several techniques have been employed for producing boron suboxide and include such procedures as reacting elemental boron (B) with boron oxide ($B_2O_3$) under suitably high pressure and high temperature conditions [1]. In U.S. Pat. No. 3,660,031 to Holcombe Jr. et al other methods of producing boron suboxides such as reducing boron oxide ($B_2O_3$) with magnesium, or by reducing zinc oxide with elemental boron are mentioned. With each of these known procedures however, there are drawbacks which retard the usefulness of the material in industry. For example, the reduction of $B_2O_3$ with magnesium produces a solid solution of magnesium and magnesium boride contaminants in the suboxide, while the reduction of magnesium oxide with boron produces only a relatively small yield of boron suboxide and is very inefficient. Holcombe Jr. et al (U.S. Pat. No. 3,660,031) produced $B_7O$ by reducing zinc oxide with elemental boron at temperatures of between 1200° C. to 1500° C. A hardness value of 38.2 GPa under 100 g load and density of 2.6 g.cm$^{-3}$ is reported for this material. The fracture toughness for this material is not discussed, because only grid and not dense materials were produced.

Petrak et al [3] investigated the mechanical and chemical properties of hot-pressed $B_6O$ and reported micro-hardness values as high as 34-38 GPa. Ellison-Hayashi et al (U.S. Pat. No. 5,330,937) produced $B_6O$ with a magnesium addition (approximately 6%) which yielded average $KHN_{100}$ values of 34 GPa to 36 GPa.

Efforts have been made to enhance the mechanical properties of $B_6O$, especially its fracture toughness, by forming $B_6O$ composites with other hard materials such as diamond [4], boron carbide [5], and cBN [6]. The diamond and cBN-containing composites were made under extremely high temperature and pressure conditions. The intention was to form pseudo-binary composite systems, stronger at the grain boundaries than those of pure $B_6O$. Even though high hardness values were recorded for the composites ($H_V$~46 GPa), again, fracture toughness values did not exceed 1.8 MPa·m$^{0.5}$. The best value here was obtained with $B_6O$-cBN composites.

Shabalala et al (WO 2007/029102 and [7]) produced $B_6O$ composites with aluminium compounds which resulted in an aluminium borate phase at the grain boundary. A fracture toughness of about 3.5 MPa·m$^{0.5}$ with a corresponding hardness of 29.3 GPa was obtained. The aluminium phases present in the composite are soft and although they may improve the fracture toughness of the resulting composite, they do not contribute to the overall hardness of the composite. Moreover, in addition to a crystalline aluminium borate, a boron oxide rich, chemically unstable amorphous phase and microporosity was formed, further resulting in reduced hardness [10, 11].

SUMMARY OF THE INVENTION

According to the present invention, there is provided a boron suboxide composite material comprising boron suboxide and a secondary phase, wherein the secondary phase contains a rare earth metal oxide.

For the purpose of this specification, "secondary phase" means everything in the composite material but the boron suboxide, and may be wholly or partially crystalline or amorphous, and may include more than one thermodynamic phase.

The rare earth metal oxide may be selected from the oxides of scandium, yttrium, which is preferred, and elements of the lanthanide series, and may be a mixture of rare earth metal oxides.

The secondary phase may also include, in addition to the rare earth metal oxide(s), a further oxide or mixture of oxides. The other oxide may be an oxide of an element of the Groups IA, IIA, IIIA, and IVA of the periodic table, and in particular may be selected from $Al_2O_3$, $SiO_2$, MgO, CaO, BaO or SrO or a mixture of these oxides.

The secondary phase of the composite material may also contain a boride, and particularly a boride selected from the borides of transition metals of the fourth to eighth groups of the periodic table. Any reference to "boride" includes a reference to a monoboride, diboride and any other form of boride. More particularly, the boride may be selected from the borides of iron, cobalt, nickel, titanium, tungsten, tantalum, hafnium, zirconium, rhenium, molybdenum and chromium. The boride may also be a platinum group metal boride, for example palladium boride.

The boron suboxide may be particulate or granular boron suboxide. The mean grain size of the boron suboxide particles or granules themselves is preferably fine and may range from 100 nm to 100 μm, preferably 100 nm to 10 μm.

Finely particulate boron suboxide may be produced, for example, by subjecting a source of boron suboxide to milling. If milling takes place in the presence of an iron or cobalt containing milling medium, some iron and/or cobalt will be introduced into the material which is sintered. For an iron-free material, the milled powder can be washed with hydrochloric acid, or the milling can be carried out with alumina pots and milling balls. It has been found to be advantageous to wash the milled powder in warm water or alcohols to remove any excess of $B_2O_3$ or $H_3BO_3$.

The amount of oxide present in the composite material of the invention will vary according to the properties desired for the composite material, particularly hardness and fracture toughness, and the type of oxide. Generally the oxide will be present in amount of up to 20 volume % of the composite. For many oxides, the oxide will generally be present in an amount of up to 10 volume % of the composite material and for yet other oxides the amount of oxide will generally be present in an amount of up to 5 volume % of the composite material.

The composite material of the invention comprises boron suboxide, generally in particulate or granular form, and the secondary phase in a bonded, coherent form. The secondary phase will preferably be present in a volume percent less than that of the boron suboxide and will be uniformly dispersed among the boron suboxide. The secondary phase can be amorphous or partially crystalline.

The invention provides a composite material containing boron suboxide and a rare earth metal oxide which has both high fracture toughness and high hardness. In particular, the composite material generally has a fracture toughness greater than 3.5 MPa·m$^{0.5}$ in combination with a Vickers Hardness ($H_V$) greater than 25 GPa. Preferably the fracture toughness of the composite material is greater than 3.5 MPa·m$^{0.5}$, and more preferably at least 4.0 MPa·m$^{0.5}$ and still more preferably at least 5.0 MPa·m$^{0.5}$. The fracture toughness ($K_{IC}$), as used herein, was measured at indentations generally with a load of 5 kg. The average of five measured was used to determine the properties of the $B_6O$ samples discussed hereinafter. The $K_{IC}$ was measured via the DCM method, using Anstis' equation [8]:

$$K_c = \delta \left(\frac{E}{H}\right)^{\frac{1}{2}} \frac{P}{c^{\frac{3}{2}}} \qquad (1)$$

where E is the Young's modulus, H the hardness and δ is a constant, which only depends on the geometry of the indenter. A value of 470 GPa was used for the Young's modulus value in this equation. For the standard Vickers diamond pyramid indenter, Anstis et al established a value of δ=0.016±0.004 as the calibration constant which was also used for these measurements.

The hardness of the composite material is preferably greater than 25 GPa and preferably at least 30 GPa. The Vickers hardness was measured using an indentation load of 5 kg. The average of five measured hardness values was used to determine the properties of the $B_6O$ composite samples.

FIG. 1 shows the preferred lower thresholds for the region of hardness and fracture toughness of composite materials of this invention in relation to the prior art boron suboxide materials. It is postulated that the improved toughness of these types of composite could be due to multiple factors such as crack deflection due to the generation of internal stresses, crack arrest mechanisms occurring in the generated secondary phases, and changes in the nature of the composition and properties of the grain boundaries between the $B_6O$ particles. Further, it has been found that the effective densification of the composite material during manufacture is enhanced by the use of a secondary phase which contains a rare earth metal oxide, alone or in combination with another oxide or boride. Densification in excess of 95 percent of the theoretical densities is possible during liquid phase densification, and can be achieved under milder temperature and pressure conditions with an oxide-containing secondary phase, than that which can be achieved when there is no oxide present in the secondary phase. In particular, densification of 98%-99% has been obtained.

The composite material of the invention may be made by providing a source of boron suboxide particles or granules; contacting the source of boron suboxide with a rare earth metal oxide to create a reaction mass; and sintering the reaction mass to produce the boron suboxide composite material. This method forms another aspect of the invention.

Sintering preferably takes place at a relatively low temperature and pressure, i.e. a pressure of less than 200 MPa and a temperature of not exceeding 1950° C. Low pressure sintering processes such as hot pressing (HP), gas pressure sintering, hot isostatic pressing (HIP) or spark plasma sintering (SPS) are preferred. The SPS process is characterised by very fast heating and short isothermal holding times, in particular with heating rates of 50-400 K/minute and isothermal holding times of 5 minutes or less. The hot pressing process is characterised by heating rates of 10-20 K/minute, and isothermal holding times of about 15 to 25, typically 20, minutes.

Consistent with this oxide-based approach is the formation of a stable oxide liquid phase during sintering which then cools to form crystalline and/or amorphous oxide secondary phases in the final product. The oxides, especially if they are a mixture of $Al_2O_3$ and $SiO_2$, react with the remaining $B_2O_3$ and form amorphous phases between the boron suboxide particles or granules.

The addition of a rare earth metal oxide chemically stabilizes the amorphous grain boundary, and makes the composite material more wear resistant. This amorphous grain boundary results from a reaction between the rare earth metal oxide and $B_2O_3$ during the liquid phase of densification. To increase wear resistance, chemically stability and high temperature stability of the material, it is preferable that the $B_2O_3$ content in the grain boundary is low. A mol ratio of $B_2O_3$/($B_2O_3$+other oxides) of less than 60 is preferable, more preferably a mol ratio of less than 30, and even more preferably a mol ratio of less than 20.

The boron suboxide may be mixed with the components necessary to produce the secondary phase prior to the sintering step. The boron suboxide may alternatively be coated with the secondary phase components prior to sintering.

Whilst it may be preferable to introduce these secondary phase components in their oxidised form prior to sintering, the secondary phase components may also be present in the reaction mass in another form capable of producing an oxide (e.g. nitrates, carbonates or oxalates forming oxides during decomposition or in their metallic state) and be allowed to oxidise within the reaction mass during sintering.

The composite material according to the invention may be used in cutting applications and in wear parts. It may also be crushed to grit form and used in grit applications. Moreover, the composite material may be used in armour applications, such as ballistic armour, and particularly body armour.

DESCRIPTION OF EMBODIMENTS OF THE INVENTION

Figure 1:
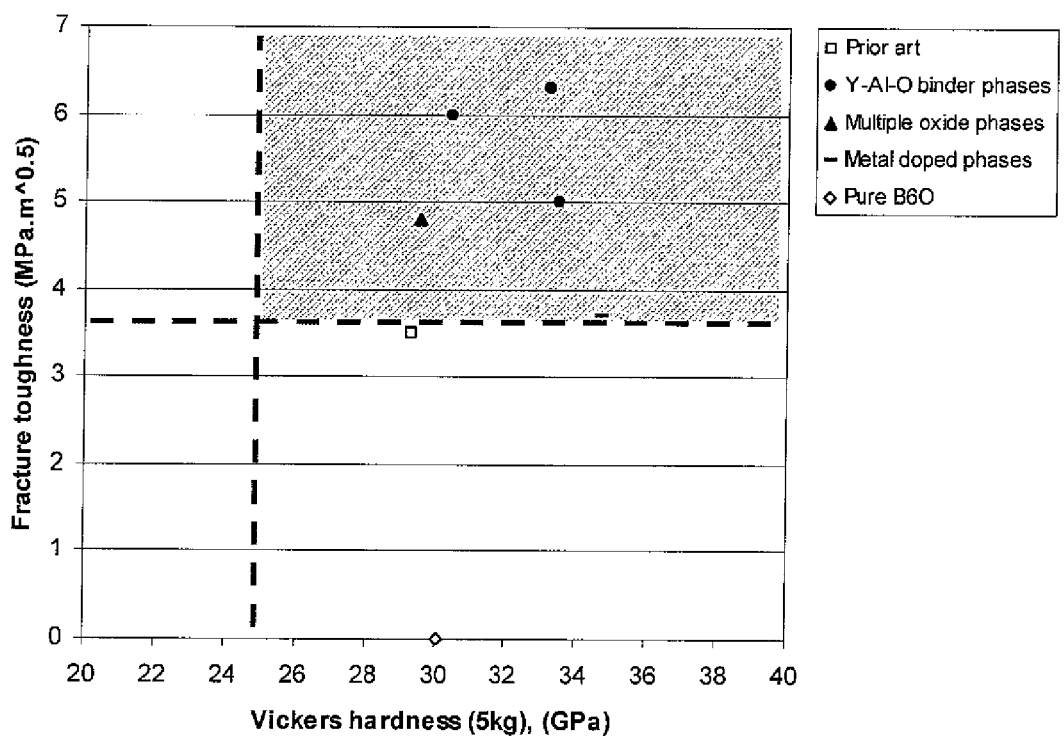
FIG. 1 is a graph showing the relative hardness and fracture toughness values for $B_6O$ composite materials of this invention; and similar types of materials from the prior art.
Figure 2:
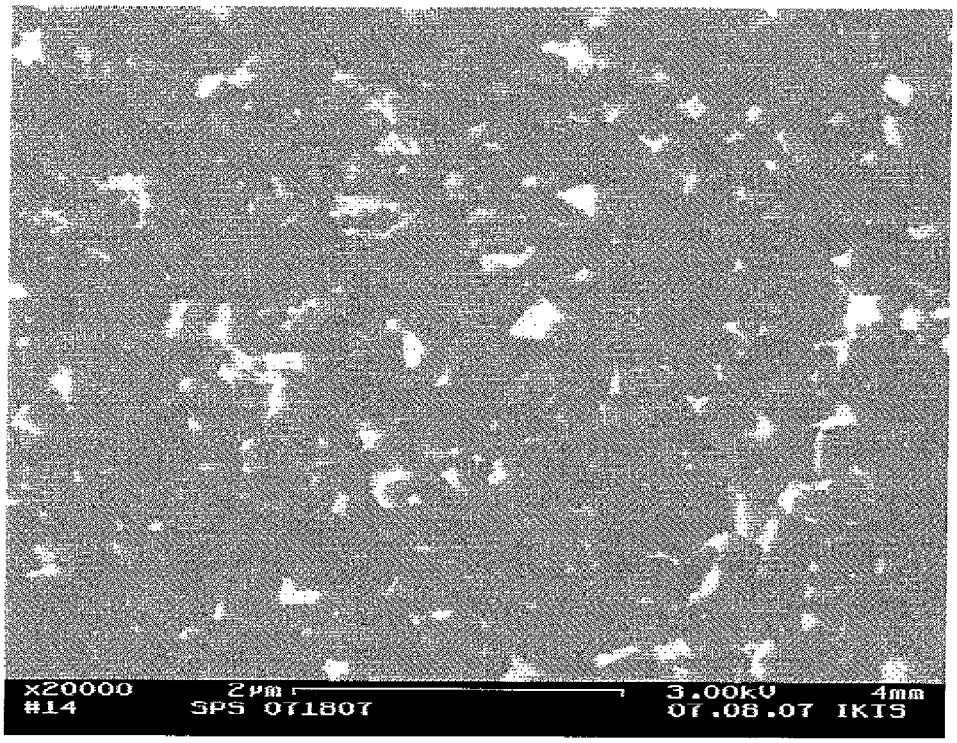
FIG. 2 is a SEM image of a sintered composite material produced from $B_6O$ admixed with 2.62% by weight of $Al_2O_3$ and 2.65% by weight of $Y_2O_3$.

The invention will now be illustrated by the following examples. Table 1 summarises these materials and their measured hardness and toughness properties for comparative purposes. In these examples the terms "secondary phase" and "grain boundary phase" are both used. The terms are used interchangeably and refer to the same phase.

Example 1

$B_6O$ starting powder was milled using an attritor mill with steel balls for 50 hours. The iron contaminants were removed by washing in HCl. The powder was subsequently washed in methanol to remove any $B_2O_3$ present. The average particle size after milling was 500 nm.

The milled powder was admixed with 2% by weight of $Al_2O_3$ and 2.65% by weight of $Y_2O_3$ in methanol and milled for two hours using a planetary mill. The milled mixture was dried using a rotary evaporator and then placed in a boron nitride cell (inside a graphite die) and sintered using a hot press at a temperature of 1800° C. and a pressure of 50 MPa, under an argon atmosphere for about 20 minutes. A fully densified composite material comprising boron suboxide particles was produced within which a secondary phase was uniformly dispersed. No crystalline phase in the secondary phase was identified by XRD. The grain boundary was an amorphous grain boundary phase containing $Y_2O_3$, $Al_2O_3$ and remaining $B_2O_3$.

A cross-section of the sample was polished and then tested for hardness and fracture toughness with Vickers indenter. The hardness was found to be about 33 GPa at a load of 5 kg and a fracture toughness of about 6 MPa·m$^{0.5}$.

Table 1 summarises the measured properties of this boron suboxide composite material. The hot pressed $B_6O$ composite of the invention had a higher hardness and fracture toughness compared to both pure $B_6O$ and the composite material produced by Shabalala et al (WO 2007/029102).

Example 2

A boron suboxide composite material was produced using the same components and conditions set out in Example 1, save that the amount of $Y_2O_3$ and $Al_2O_3$ components was reduced by half, with the ratio between the two being kept the same. The composite material produced was fully densified and was also found to contain $Y_2O_3$, $Al_2O_3$ and remaining $B_2O_3$. It had a hardness of 30.4 GPa and a fracture toughness of 6.0 MPa·m$^{0.5}$.

Example 3

A boron suboxide composite material was produced using the same components and conditions set out in Example 1, save that the components for the secondary phase included an additional 1.0 weight % $SiO_2$. The composite material produced was fully densified and was found to contain an amorphous grain boundary phase containing $Y_2O_3$, $Al_2O_3$ and remaining $B_2O_3$. It had a hardness of 33.5 GPa and a fracture toughness of 5.0 MPa·m$^{0.5}$.

Example 4

$B_6O$ starting powder was milled using an attritor mill with alumina balls, in an ethanol solvent. After milling the suspension was dried using a rotation evaporator. The wear of the alumina balls was included in the overall composition of the materials in Table 1.

The milled powder was admixed with 2.62% by weight of $Al_2O_3$ (including 0.62% from wear of the alumina balls) and 2.65% by weight of $Y_2O_3$ in isopropanol and milled for two hours using a planetary mill. The milled mixture was dried using a rotary evaporator, after which fast spark plasma sintering was carried out using graphite dies with graphite foils. The graphite foils were coated with a BN suspension to prevent interaction with the graphite. The milled mixture was sintered using the SPS method with a heating rate of 50 K/min, a temperature of 1740° C., and a pressure of 115 MPa, under an argon atmosphere for about 5 minutes. The heating rate was 50 K/minute. Since a nonconductive hBN lining or coating was used, the densification was more a fast hot pressing than a SPS-process, which is characterized by a current going through the powder.

A fully densified composite material was produced comprising boron suboxide particles within which a secondary phase was uniformly dispersed. A cross-section of the sample was polished and then tested for hardness and fracture toughness with a Vickers indenter. The hardness was found to be about 34.9±0.63 GPa at a load of 0.4 kg and a fracture toughness of about 4 MPa·m$^{0.5}$.

Example 5

A boron suboxide composite material was produced using the same components and conditions set out in Example 4, save that the milled mixture was sintered using a temperature of 1800° C. and a pressure of 80 MPa, using the same SPS method as in example 4. The composite material produced was fully densified. It had a hardness of 33 GPa at 0.4 kg and a fracture toughness of 4 MPa·m$^{0.5}$.

Example 6

A boron suboxide composite material was produced using the same components and conditions set out in Example 4, except that the milled powder was admixed with 2.0% by weight of $Al_2O_3$ (including wear of the alumina balls) and 2.0% by weight of $Y_2O_3$, and sintered at a temperature of 1850° C. and a pressure of 50 MPa. The composite material produced was fully densified and was also found to contain $Y_2O_3$, $Al_2O_3$ and some residual $B_2O_3$. It had a hardness of 34 GPa and a fracture toughness of 4 MPa·m$^{0.5}$.

Example 7

$B_6O$ starting powder was milled using a jet mill. The average particle size after milling was 2.3 μm. In example 7a the milled $B_6O$ powder was admixed with 2% by weight of $Al_2O_3$ (including wear of the alumina balls), 2% by weight of $Y_2O_3$, 2% by weight of $HfO_2$, and 0.53% by weight of MgO (which comes from the starting B powder used for preparation of the $B_6O$) in isopropanol and milled for six hours using an attrition mill with $Al_2O_3$ balls. A second sample (example 7b) was prepared without the $Y_2O_3$ addition. The milled mixture was dried using a rotary evaporator and then placed in a graphite die coated with hexagonal BN, and sintered using the SPS method with a heating rate of 50 K/minute and a holding time of 5 minutes, under an argon atmosphere.

Densification was carried out at 1850° C. and 1900° C. A fully densified composite material comprising boron suboxide particles was produced within which a secondary phase was uniformly dispersed. In the sample containing $Y_2O_3$, the boride $HfB_2$ was formed, together with an amorphous grain boundary. In the sample without the $Y_2O_3$ addition, an additional crystalline phase was detected by XRD containing $Al_{18}B_4O_{33}$. The MgO together with the remaining $B_2O_3$ and some $Al_2O_3$ formed an amorphous grain boundary phase. This amorphous grain boundary phase is more stable than that formed with only $Al_2O_3$ (Shabalala). The typical feature of formation of micropores was not observed, resulting in higher hardness values.

A cross-section of the sample was polished and then tested for hardness and fracture toughness with Vickers indenter. The hardness values at a load of 0.4 kg are depicted in Table 1.

Examples 8-9

Boron suboxide composite materials were produced using the same conditions set out in Example 7, but replacing the $HfO_2$ with $WO_3$, $TiB_2$ and $TiH_2$ respectively in the ratios provided in Table 1. Densification was carried out at 1850° C. and 1900° C. At 1850° C. densities of 96-98% were observed. At 1900° C. densities of more than 98% were observed.

In the samples, some $Al_{18}B_4O_{33}$ and a boride was also formed. There was no formation of microporosity as in Shabalala et al (WO 2007/029102 and [9]) indicating a more stable grain boundary phase. In addition to the oxide phase, borides ($HfB_2$, $W_2B_5$, which is a composition with a homogeneity range and sometimes is named also as $WB_2$-$W_2B_5$ and $WB_2$ are used as equivalents because a detailed determination of the lattice constants was not carried out) were also formed in all the examples.

Examples 10-11

Boron suboxide composite materials were produced using the same conditions set out in Example 1, but replacing the secondary phase materials as set out in Table 1. The results obtained in the various tests and measurements can also be found in Table 1.

Examples 12-13

Boron suboxide composite materials were produced using the same conditions set out in Example 7, but replacing the secondary phase materials as set out in Table 1. The results obtained in the various tests and measurements can also be found in Table 1.

The addition of 10 wt % $TiB_2$ to the composition of the $B_6O+Y_2O_3/Al_2O_3$ does not change the densification behaviour.

The material with $WO_3$ (example 8) additions is nearly 100% dense and the formation of borides is visible. The particle size of the precipitated borides is less than 1 μm. Without the addition of the rare earth metal oxides, the amorphous oxide grain boundary phase is less stable and is more readily polished out from the sample, which indicates that the addition of rare earth metal oxides increases wear resistance. It is also known from glass science that a reduction of $B_2O_3$, which occurs with an increase in $Y_2O_3$ content, will increase the glass transition temperature, which means an increase in high temperature stability [12].

The results show the possibility of producing dense superhard $B_6O$ materials without high pressure. The improved densification of these materials in comparison to pure $B_6O$ is connected with the formation of a liquid phase during densification.

TABLE 1

| No. | Material components (sintering temp, ° C.) | Additive Ratio (weight %) | $H_V$(5 kg), (GPa) | $K_{IC}$, (MPa·m$^{0.5}$) | Phases (after sintering) | Density (g/cm$^3$) |
|---|---|---|---|---|---|---|
| Ref* | $B_6O$ | — | 30.1 (1 kg Load) | Brittle | $B_6O$ | 2.5 |
| Prior art* | $B_6O + Al_2O_3$ | — | 29.3 | 3.5 | $B_6O$ $Al_4B_2O_9$ | |
| Ex 1 | $B_6O + Al_2O_3 + Y_2O_3$ (1800° C.) | 2:2.65 | 33.2 ± 2.8 | 6.3 ± 1.0 | $B_6O$ amorphous secondary phase | 2.53 |
| Ex 2 | $B_6O + Al_2O_3 + Y_2O_3$ (1800° C.) | 1:1.32 | 30.4 ± 1.8 | 6.0 ± 0.4 | $B_6O$ amorphous secondary phase | 2.41 |
| Ex 3 | $B_6O + Al_2O_3 + Y_2O_3 + SiO_2$ (1800° C.) | 2:2.65:1 | 33.5 ± 2.2 | 5.0 ± 1.0 | $B_6O$ amorphous secondary phase | 2.46 |
| Ex 4 | $B_6O + Al_2O_3 + Y_2O_3$ (1740° C.) | 2.62:2.65 | 33.4 ± 0.6** | 4.3 | $B_6O$ amorphous secondary phase | 2.56 |
| Ex 5 | $B_6O + Al_2O_3 + Y_2O_3$ (1800° C.) | 2.62:2.65 | 33.0 ± 0.7** | 4.0*** | $B_6O$ amorphous secondary phase | 2.60 |
| Ex 6 | $B_6O + Al_2O_3 + Y_2O_3$ (1850° C.) | 2:2 | 32.1 ± 0.6** | 4.0*** | $B_6O$ amorphous secondary phase | 2.53 |
| Ex 7 | $B_6O + Al_2O_3 + Y_2O_3 + HfO_2 + MgO$ (1900° C.) | 2:2:2:0.53 | 34.2 ± 0.5** | 4 | $B_6O$, $HfB_2$ amorphous secondary phase | 2.52 |
| Ex 8a | $B_6O + Al_2O_3 + Y_2O_3 + WO_3 + MgO$ (1900° C.) | 2:2:4:0.53 | 35.6 ± 0.4** | 4 | $B_6O$, $W_2B_5$ amorphous secondary phase | 2.65 |
| Ex 8b | $B_6O + Al_2O_3 + Y_2O_3 + WO_3 + MgO$ (1850° C.) | 2:2:4:0.53 | 34.0 ± 0.5** | 4 | $B_6O$, $W_2B_2$ amorphous secondary phase | 2.61 |
| Ex 9a | $B_6O + Al_2O_3 + Y_2O_3 + TiH_2 + MgO$ (1900° C.) | 2:2:5:0.53 | 36.1 ± 0.6** | 4 | $B_6O$, $TiB_2$ amorphous secondary phase | 2.49 |

TABLE 1-continued

| No. | Material components (sintering temp, °C.) | Additive Ratio (weight %) | $H_V$(5 kg), (GPa) | $K_{IC}$, (MPa·m$^{0.5}$) | Phases (after sintering) | Density (g/cm$^3$) |
|---|---|---|---|---|---|---|
| Ex 9b | $B_6O + Al_2O_3 + Y_2O_3 + TiB_2 + MgO$ (1900° C.) | 2:2:10:0.53 | 36.8 ± 0.5** | 4 | $B_6O$, $TiB_2$ amorphous secondary phase | 2.68 |
| Ex 10 | $B_6O + La_2O_3$ (1850° C.) | 2.5 | 31.0 ± 1.8 | 5.6 | $B_6O$, $LaB_6$ amorphous secondary phase | 2.47 |
| Ex 11 | $B_6O + Yb_2O_3$ (1850° C.) | 1.5 | 30.4 ± 1.6 | 4.0 | $B_6O$, $YbB_6$ amorphous secondary phase | 2.59 |
| Ex 12 | $B_6O + Al_2O_3 + Sc_2O_3 + MgO$ (1900° C.) | 2:2:0.53 | 36.7 ± 0.6** | 4 | $B_6O$ amorphous secondary phase | 2.57 |
| Ex 13 | $B_6O + Al_2O_3 + Y_2O_3 + BN$ (1900° C.) | 2:2:2 | 31.3 ± 0.8** | 3.6 | $B_6O$ amorphous secondary phase | 2.45 |

*Data for reference and prior art sample taken from Shabalala et al. (WO2007/029102)
**measured with 0.4 Kg load
***Measured with SENB Method Notch radius 30 μm

REFERENCES

1. H. Hubert, L. Garvie, B. Devouard, P. Buseck, W. Petuskey, P. McMillan, Chem. Mater.; 10; (1998); pp. 1530-1537
2. H. Itoch, I. Maekawa, H. Iwahara, J. Soc. Mat. Sci., Japan; 47(10); (1998); pp. 1000-1005
3. R. R Petrak, R. Ruh, G. R. Atkins, Cer. Bull.; 53(8); (1974); pp. 569-573
4. R. Sasai, H. Fukatsu, T. Kojima, and H. Itoh, J. Mater. Sci.; 36; (2001); pp. 5339-5343
5. H. Itoh, I. Maekawa, and H. Iwahara; J. Mater. Sci.; 35; (2000); pp. 693-698
6. H. Itoh, R. Yamamoto, and H. Iwahara; J. Am. Ceram. Soc.; 83(3); (2000); pp. 501-506
7. T. C. Shabalala, D. S. Mclachlan, I. J. Sigalas, M. Herrmann; Advances in Sci and Tech.; 45; (2006); pp. 1745-1750
8. G. Anstis, P. Chantikul, B. Lawn and D. Marshall; "A critical evaluation indentation techniques for measuring fracture toughness: I, Direct crack measurements", J. Am. Ceram. Soc.; 64; (1981); pp 533-538
9. He, D., Zhao, Y., Daemen, L., Qian, J., Shen, T. D. & Zerda, T. W. Boron suboxide: As hard as cubic boron nitride, *Appl. Phys. Lett.* Vol. 81, 4, 643-645 (2002)
10. A. Andrews, M. Herrmann, T. C. Shabalala, and I. Sigalas, "Liquid phase assisted hot pressing of boron suboxide materials", *J. Europ. Ceram. Soc.* 28, 1613-1621 (2008)
11. H. J. Kleebe, S. Lauterbach, T. C. Shabalala, M. Herrmann and I. J. Sigalas, "$B_6O$: A Correlation Between Mechanical Properties and Microstructure Evolution Upon $Al_2O_3$ Addition During Hot-Pressing", *J. Amer. Ceram. Soc.,* 91 [2] 569-575 (2008))
12. Rutz H. L., Day D. E. and Spencer C. F., J. Am. Ceram. Soc., 1990, vol. 73, No. 6, p. 1788.

The invention claimed is:

1. A boron suboxide composite material comprising boron suboxide and a secondary phase, the secondary phase containing a rare earth metal oxide and a second oxide; wherein the rare earth metal oxide is yttrium oxide and the second oxide is aluminum oxide.

2. A composite material according to claim 1 wherein the secondary phase also contains a boride.

3. A composite material according to claim 2 wherein the boride is selected from the borides of transition metals of the fourth to eighth groups of the periodic table.

4. A composite material according to claim 3 wherein the boride is selected from a boride of iron, cobalt, nickel, titanium, tungsten, tantalum, hafnium, zirconium, rhenium, molybdenum and chromium.

5. A composite material according to claim 3 wherein the boride is a platinum group metal boride.

6. A composite material according to claim 5 wherein the platinum group metal boride is palladium boride.

7. A composite material according to claim 2 wherein the rare earth metal oxide is present in an amount of up to 20 volume of the composite material.

8. A composite material according to claim 7 wherein the rare earth metal oxide is present in an amount of up to 10 volume % of the composite material.

9. A composite material according to claim 7 wherein the rare earth metal oxide is present in an amount of up to 5 volume % of the composite material.

10. A composite material according to claim 1 wherein the boron suboxide is particulate or granular boron suboxide.

11. A composite material according to claim 1 wherein the mean grain size of the boron suboxide particles or granules range from 100 nm to 100 μm.

12. A composite material according to claim 11 wherein the mean grain size of the boron suboxide particles or granules range from 100 nm to 10 μm.

13. A composite material according to claim 1 wherein the boron suboxide is present in an amount of at least 50 volume % of the composite material.

14. A composite material according to claim 1 wherein the fracture toughness of the composite material is greater than 3.5 MPa·m0.5.

15. A composite material according to claim 1 wherein the Vickers hardness of the composite material is greater than 25 GPa.

16. A method of producing a boron suboxide composite material according to claim 1, comprising the steps of:
   providing a source of boron suboxide;
   contacting the source of boron suboxide with yttrium oxide and aluminum oxide, or compounds or metals capable of forming such oxides, to create a reaction mass; and sintering the reaction mass to produce the boron suboxide material.

17. A method according to claim 16 wherein the reaction mass is sintered at a pressure of less than 200 MPa and a temperature of not exceeding 1950° C.

18. A method according to claim 16 wherein the reaction mass is sintered by a heating rate of 50-400 K/min and an isothermal holding time of 5 minutes or less.

19. A method according to claim 16 wherein the reaction mass is sintered by heating rates of 8-10 K/min and isothermal holding times of 15-25 minutes.

20. A method according to claim 16 wherein contacting the boron suboxide with the rare earth metal oxide or a compound or metal is done by way of mixing.

\* \* \* \* \*